(12) United States Patent
Hori

(10) Patent No.: US 6,557,505 B1
(45) Date of Patent: May 6, 2003

(54) CONTROL DEVICE FOR ENGINE PROVIDED WITH ELECTROMAGNETIC DRIVEN INTAKE VALVES

(75) Inventor: Toshio Hori, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/335,767

(22) Filed: Jun. 18, 1999

(30) Foreign Application Priority Data

Jun. 19, 1998 (JP) .......................... 10-172539

(51) Int. Cl.⁷ .................................. F01L 9/04
(52) U.S. Cl. ........................ 123/90.11; 123/90.15; 60/284; 60/285
(58) Field of Search ................. 123/90.11, 90.15, 123/346, 348, 443, 478, 480, 692, 90.16, 90.17, 90.18; 60/274, 284, 285, 286, 301

(56) References Cited

U.S. PATENT DOCUMENTS

| | | | |
|---|---|---|---|
| 4,006,722 A | * | 2/1977 | Hata et al. .................. 123/443 |
| 4,503,824 A | * | 3/1985 | Ninomiya et al. ........... 123/443 |
| 4,532,905 A | * | 8/1985 | Yokooku et al. ............. 123/443 |
| 5,117,790 A | * | 6/1992 | Clarke et al. ............. 123/90.11 |
| 5,201,296 A | * | 4/1993 | Wunning et al. ......... 123/90.11 |
| 5,377,654 A | * | 1/1995 | LoRusso et al. ............. 123/692 |
| 5,657,625 A | * | 8/1997 | Koga et al. .................. 60/274 |
| 5,661,971 A | * | 9/1997 | Waschatz et al. ............. 60/285 |
| 5,743,221 A | | 4/1998 | Schmitz |
| 5,746,164 A | | 5/1998 | Schrey |
| 5,758,493 A | * | 6/1998 | Asik et al. ..................... 60/274 |
| 5,765,514 A | * | 6/1998 | Sono et al. ............... 123/90.11 |
| 5,765,528 A | | 6/1998 | Kamimaru |
| 5,803,048 A | * | 9/1998 | Yano et al. .................. 123/443 |
| 5,930,992 A | * | 8/1999 | Esch et al. ..................... 60/274 |
| 6,213,068 B1 | * | 4/2001 | Hassdenteufel .......... 123/90.15 |
| 6,327,835 B1 | * | 12/2001 | Surnilla et al. ................ 60/274 |

FOREIGN PATENT DOCUMENTS

| | | | |
|---|---|---|---|
| DE | 2640941 | * | 9/1975 |
| DE | 19526848 | | 4/1998 |
| DE | 19534876 | | 5/1998 |
| DE | 19731373 | | 6/1998 |
| FR | 2414124 | * | 9/1979 |
| JP | 55-33000 | * | 3/1980 |
| JP | A-8-200135 | | 8/1996 |

* cited by examiner

Primary Examiner—Thomas Denion
Assistant Examiner—Tu M. Nguyen
(74) Attorney, Agent, or Firm—Crowell & Moring LLP

(57) ABSTRACT

A control device for an engine provided with an electromagnetic driven intake valves is provided so that the intake valves may perform a desirous control (for example, early activation of a catalytic converter) in an excellent driving state without having to bring about unfavorable phenomena such as a variety of rotation or serge of the engine. The control device serves to make the given cylinders different in the opening or shutting timing of intake valve from the other cylinders according to the driving state.

15 Claims, 16 Drawing Sheets

FIG. 8

| #1 CYLINDER | ☆ INTAKE | COMPRESSION | EXPANSION | EXHAUST ○ | ☆ INTAKE | COMPRESSION |
|---|---|---|---|---|---|---|
| #3 CYLINDER | EXHAUST ● | ★ INTAKE | COMPRESSION | EXPANSION | EXHAUST ● | ★ INTAKE |
| #4 CYLINDER | EXPANSION | EXHAUST ○ | ☆ INTAKE | COMPRESSION | EXPANSION | EXHAUST ○ |
| #2 CYLINDER | COMPRESSION | EXPANSION | EXHAUST ● | ★ INTAKE | COMPRESSION | EXPANSION |

☆ INTAKE VALVE, LONG OPENING TIME
★ INTAKE VALVE, SHORT OPENING TIME
○ LEAN EXHAUST GAS
● RICH EXHAUST GAS

R: INTAKE VALVE, SHORT OPENING TIME
L: INTAKE VALVE, LONG OPENING TIME

R: INTAKE VALVE, SHORT OPENING TIME
L: INTAKE VALVE, LONG OPENING TIME

CONTROL DEVICE FOR ENGINE PROVIDED WITH ELECTROMAGNETIC DRIVEN INTAKE VALVES

BACKGROUND OF THE INVENTION

The present invention relates to a control device for an engine provided with electromagnetic driven intake valves and more particularly to the control device for an engine provided with an electromagnetic driven intake valves that is constructed to independently control an operation timing of the intake valve in each cylinder.

As a mechanism for controlling a valve operation timing of electromagnetic driven intake valves, conventionally, there has been known a technique disclosed in JP-A-8-200135. This mechanism is constructed to detect an actual operation time of the valve, compare the detected time with a command value given for driving an electromagnetic valve, and detect an abnormality of the electromagnetic valve based on the compared result.

The electromagnetic valve driving technique disclosed in such a prior art has not been constructed to take into consideration a technique of independently controlling the valve timing for each cylinder.

SUMMARY OF THE INVENTION

It is therefore an object of the present invention to provide a control device for an engine provided with an electromagnetic driven intake valve which is constructed to focus on the operativity of the electromagnetic driven intake valve, that is, the independent operativity of the intake valve timing of each cylinder in response to an electric command value and secure a desirous control such as activation of a catalytic converter for exhaust emission control, which has conventionally had difficulty in being compossible to drivability, as keeping the excellent drivability, when requested.

In carrying out the foregoing object, the control device for an engine provided with an electromagnetic driven intake valve is constructed to control an electromagnetic driven type intake valve that may drive and control the intake valve for each cylinder and at least one cylinder so that the cylinder has a different crank angle timing of opening or shutting (closing) the intake valve from another cylinder.

BRIEF DESCRIPTION OF THE DRAWINGS

FIG. 8 is a table for describing an operation of an engine according to an embodiment of the present invention;

DESCRIPTION OF THE EMBODIMENTS

Hereafter, the description will be oriented to a control device for an engine provided with an electromagnetic driven intake valve according to an embodiment of the present invention with reference to the appended drawings.

Figure 3:
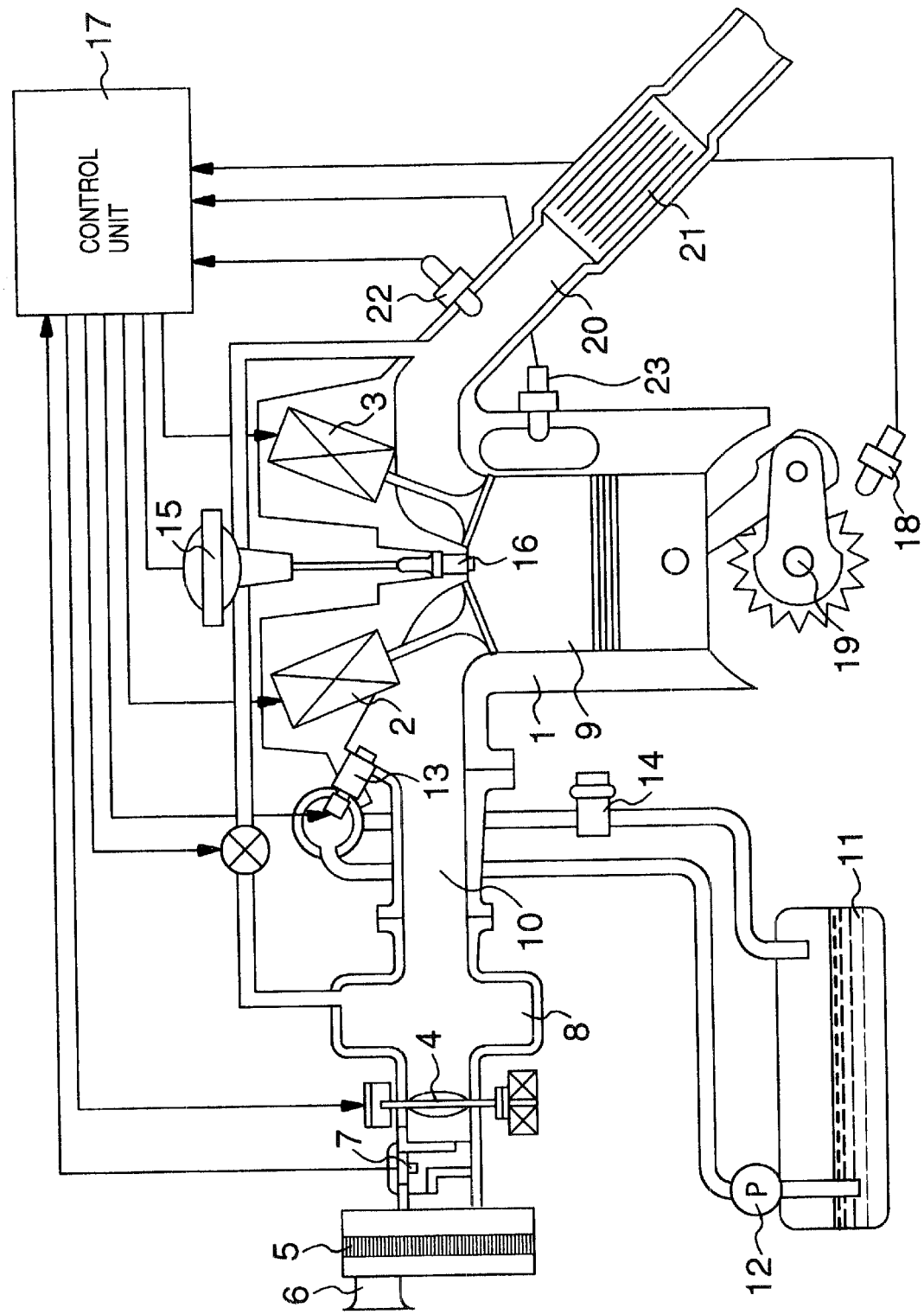
FIG. 3 shows an overall construction of an engine with engine control system to which the present invention applies.

FIG. 3 shows an overall construction of a cylinder injection engine system having an electromagnetic driven intake valve according to an embodiment of the present invention. In FIG. 3, an air flow sucked into an engine 1 is controlled by controlling a opening amount of an intake valve (IV) 2. The intake valve 2 is an electromagnetic valve as is an exhaust valve (EV) 3. Further, an electronic control type throttle valve (ETC) 4 is provided for assisting in controlling the intake air flow.

In FIG. 3, the air sucked into the engine 1 is taken from an intake port 6 of an air cleaner 5, passes through an air-flow meter 7 served as measuring an intake air flow Qa, and enters into a collector 8. The air sucked into the collector 8 is distributed into intake tubes or manifold 10 which are connected to the insides of the cylinders 9 respectively and then is guided into a combustion chamber of each cylinder 9.

On the other hand, fuel such as gasoline is sucked from a fuel tank 11 and pressurized by a fuel pump 12 and then is supplied to a fuel system having an injector 13 located therein. The pressurized fuel is regulated into a constant pressure (for example, 3 kg/cm$^2$) through the effect of a fuel pressure regulator 14 and then is injected from an injector 13 provided in the cylinder 9 to the inside of an intake tube 10. The injected fuel is ignited by an ignition plug 16 with an ignition signal having high voltage generated by an ignition coil 15.

A numeral 17 denotes a control unit that is inputted with a signal for indicating an intake air flow from the air-flow meter 7, an angular signal POS of a crank shaft 19 sent from a crank angle sensor 18, and a detection signal of exhaust gas sent from an air-fuel (A/F) sensor 22 provided before a catalytic converter 21 contained in the exhaust tube 20.

The intake air flow signal detected by the air-flow meter 7 is filtered and converted into an air flow valve. The intake air flow is divided by engine speed and then is multiplied by a coefficient k thereby to make an A/F a stoichiometric valve. The resulting value is a width of a basic fuel injection pulse for one cylinder, that is, a basic fuel injection. Then, a fuel correction is executed according to a driving state of an engine based on the basic fuel injection. Next, the injector is driven so that the fuel is supplied to each cylinder. Further, the actual A/F can be detected from the output of the A/F sensor 22 provided in the exhaust tube 20. Hence, a desired A/F mixture can be obtained if necessary by performing a closed loop control for adjusting a supply fuel amount in response to the signal of the A/F sensor (see FIG. 14).

Figure 14:
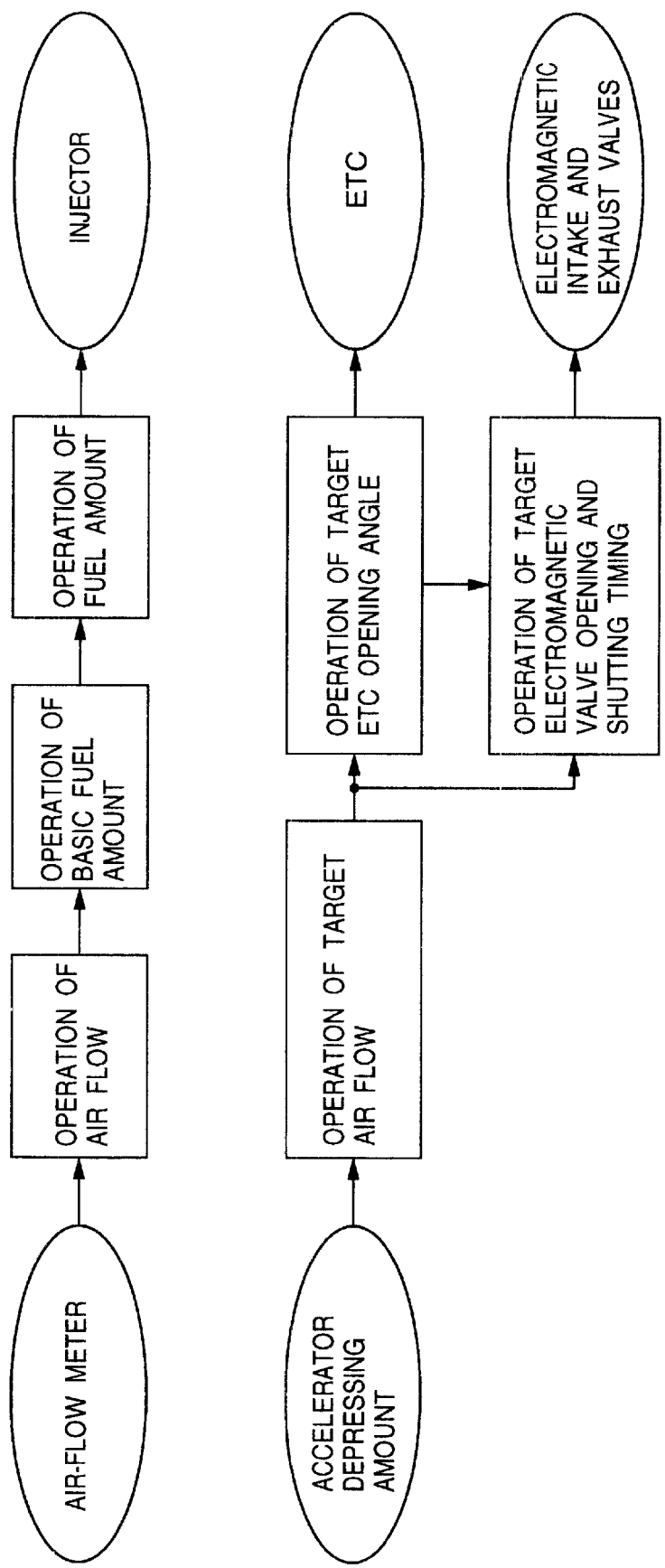
FIG. 14 is a block diagram for describing a control operation containing an embodiment of the present invention.

Though the electromagnetic intake valve 2 and ETC 4 are served to control the intake air flow, as shown in FIG. 14, the command values for driving the intake valve 2 and the ETC 4 are derived by taking the steps of operating a target air flow to be requested on a driver's depressing amount of an accelerator pedal, operating a target ETC opening angle from the target air flow, and operating a required valve timing of the electromagnetic intake valve for achieving the target air flow in the condition from the target ETC opening angle and the target air flow. The ETC and the electromagnetic intake valve are driven in response to those target values for the ETC and the valve operated as stated above so that the valve and the ETC may be served to supply the target air flow. Then, the corresponding fuel to the intake air flow is supplied so that the engine may be driven to supply an output according to the driver's intention.

It goes without saying that various operations shown in FIG. 14 are contained in the process of the control unit 17.

Figure 15:
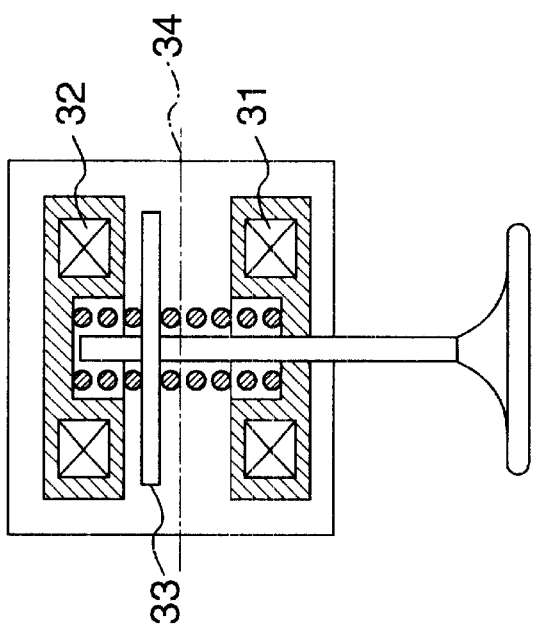
FIG. 15 is a cross section view showing a structure of an electromagnetic driven intake valve to which the present invention applies.

FIG. 15 shows a concrete construction of the intake valve (IV) 2 or the exhaust valve (EV) 3. The valve is provided with an electromagnetic coil 31 to be switched on when the valve is shut, an electromagnetic coil 32 to be switched on when the valve is opened, and a movable member 33 served to receive force of a coil spring and to be pulled toward the electromagnetic coil 31 or 32.

When the engine is stopped, neither the electromagnetic coils 31 and 32 are driven, so that the member 33 is lifted in a middle line 34 as shown by an alternate long and short dash line of FIG. 15. When the valve is opened, the electromagnetic coil 32 is driven so that the movable member 33 is lifted in the uppermost line. When the valve is closed, the electromagnetic coil 31 is driven so that the member 33 is lifted in the lowermost line.

Figure 1:
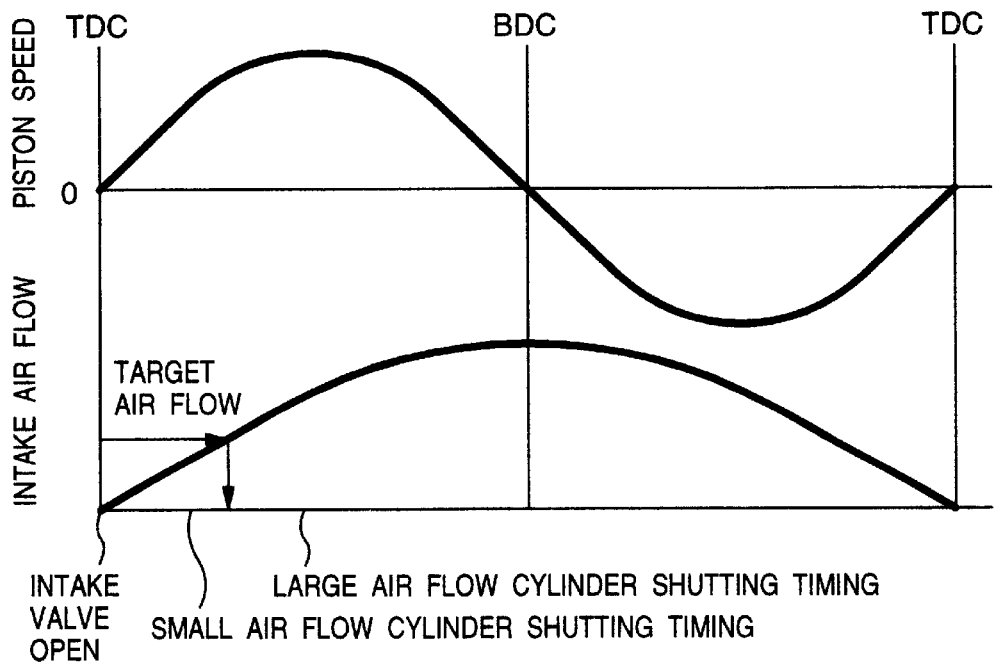
FIG. 1 is a chart for describing an operation of an embodiment of the present invention.

In turn, the description will be oriented to an example of a method of driving the electromagnetic intake valve with reference to FIG. 1. In FIG. 1, an axis of abscissas indicates a rotation phase of a crank shaft ranging an intake TDC (Top Dead Center) to a compression TDC. An upper axis of ordinates indicates a piston speed and a lower axis of ordinates indicates an air flow inside of the cylinder when the intake valve is opened and the exhaust valve is closed. For simplifying the description, the change of the air flow inside of the cylinder caused by the air inertia is ignored. The piston is moved from the intake TDC in the lower direction shown in FIG. 3, so that the corresponding air to the volume of the movement of the piston is flown into the cylinder. Hence, the intake air flow is represented as an integration of the piston speed as shown in FIG. 1. Since the piston is moved toward the upper direction shown in FIG. 3 between the intake BDC (Bottom Dead Center) and the compression TDC, the speed is reverse to the intake stroke. It means that the intake air flow is decreased from a maximum value of the intake BDC into zero at the compression TDC.

Figure 2:
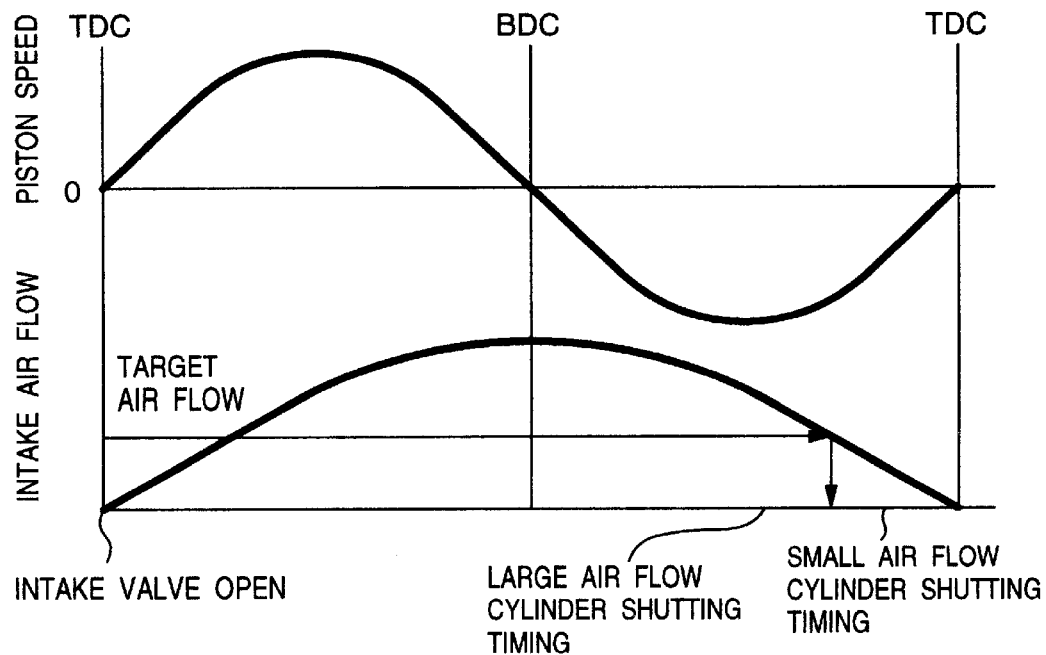
FIG. 2 is a chart for describing an operation of an embodiment of the present invention.

It is to be understood from the foregoing phenomenon that a target air flow may be supplied into the cylinder by opening the intake valve at the intake TDC and closing the intake valve at a crank angle at which the intake air flow reaches a target value. That is, on the timing of the crank angle crossed with a characteristic curve along a horizontal arrow of the target air flow shown in FIG. 1, the intake valve is set to be shut, when the target air flow may be supplied into the cylinder. The cylinder shutting timing at a large air flow and the cylinder shutting timing at a small air flow will be described below. In addition to the intake valve shutting timing shown in FIG. 1, there exists another timing when the same target air flow may be supplied into the cylinder. That is, there exists an timing as shown in FIG. 2 when after the intake BDC, the intake valve is shut in the compression stroke. The former timing is referred to as early shut of the intake valve and the latter timing is referred to as later shut of the intake valve.

Figure 4:
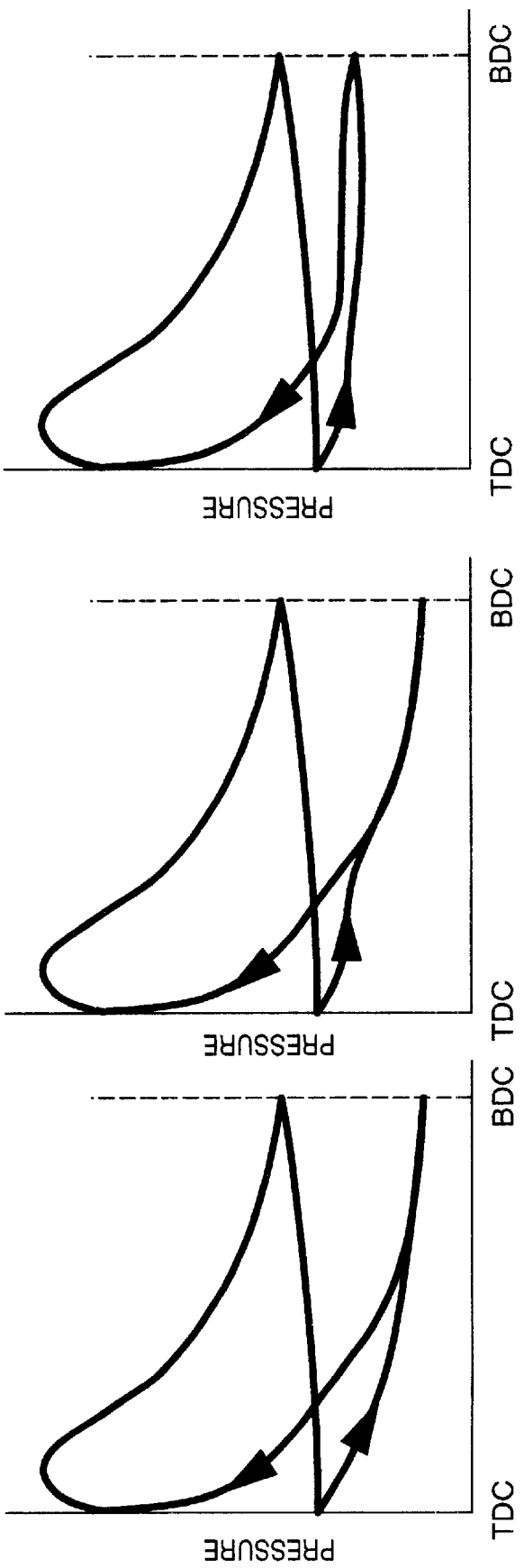
FIGS. 4A, 4B and 4C are charts for describing operations of an engine in different valve closing timings.

The relation between the crank angle phase and the pressure inside of the cylinder when the valve is opened or shut as mentioned above is shown in FIGS. 4A, 4B and 4C. FIGS. 4A–4C show a characteristic appearing when the corresponding fuel to the intake air flow is supplied and is combusted.

At first, in the conventional intake stroke as shown in FIG. 4A, the ETC is served as an air metering unit for realizing the target intake air flow. The pressure inside of the intake tube is a vacuum with respect to the atmosphere pressure. When the intake valve is opened, the pressure inside of the cylinder comes closer to a pressure of the intake tube. Then, when the stroke is shifted into the compression stroke, the intake air is compressed so that the pressure inside of the cylinder goes higher. At a given timing, the mixture inside of the cylinder is ignited by an ignition plug. The heat generated by the combustion serves to expand the combustion gas, so that the pressure inside of the cylinder goes higher than the previous point. During the process, the stroke is shifted into an expansion stroke, where the high pressure is made lower as it serves to push down the piston. In the next exhaust stroke, the exhaust valve is opened, when the pressure inside of the cylinder comes closer to a pressure of the exhaust tube through which exhaust gas is discharged from the cylinder.

In the early shut operation of the intake valve as shown in FIG. 4B, the pressure inside of the cylinder indicates a closer value to the atmospheric pressure while the intake valve is open. The timing when the intake valve is closed is shifted toward the characteristic of the conventional intake stroke. Later than the compression stroke, the state inside of the cylinder is the same as that in the conventional stroke (FIG. 4A), so that the characteristics of the strokes are the same as those of the conventional strokes.

In the late shut operation of the intake valve as shown in FIG. 4C, in the intake stroke, the intake valve is open. Hence, the pressure inside of the cylinder indicates a closer value to the atmospheric pressure. After the intake valve is shut in the compression stroke, like the early shut of the intake valve, it indicates the same characteristic as those in the conventional strokes (FIG. 4A).

Herein, consider work is done by the engine toward the outside. The work done is determined from the integration operation of cylinder pressure characteristic curve. In the stroke directed from the TDC to the BDC, the positive work is done, while in the stroke directed reversely, the negative work is done. In the intake and compression strokes, it is understood that the value of negative work done by the engine in the conventional intake stroke (FIG. 4A) is larger than the value of work in the early shut or the later shut operation (FIG. 4B or 4C). It means that in the early shut or late shut, the thermal efficiency or fuel economy is better than that in the conventional intake stroke. This is one of the advantages given by the control executed by the electromagnetic intake valve.

Figure 7:
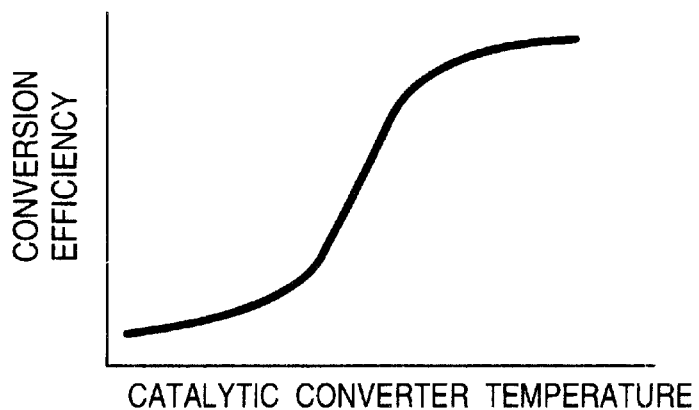
FIG. 7 is a chart for describing an example of a characteristic of a catalytic converter.

Next, the description will be oriented to the operation of the invention viewed from another point. The exhausted gas from the engine generally contains carbon monoxide CO, hydrocarbon HC, and nitrogen oxides $NO_x$. For preventing those undersirable components from being discharged into the atmosphere, the catalytic converter 21 is provided for oxidation and deoxidization those components, thereby to convert them into harmless components. Herein, it is necessary to raise the catalytic converter to a given temperature for the purposes of activating the catalytic converter, thereby achieving sufficient conversion efficiency. FIG. 7 shows an example of the conversion characteristic. That is, immediately after the engine start, the catalytic converter has the same temperature as the atmosphere. In this state, the conversion efficiency is small. After the engine start, the catalytic converter is heated by the exhaust gas as well as the oxidation of CO and HC and finally activated. Hence, the rapid activation of the catalytic converter after the start is effective from a viewpoint of the exhaust emission control.

Figure 5:
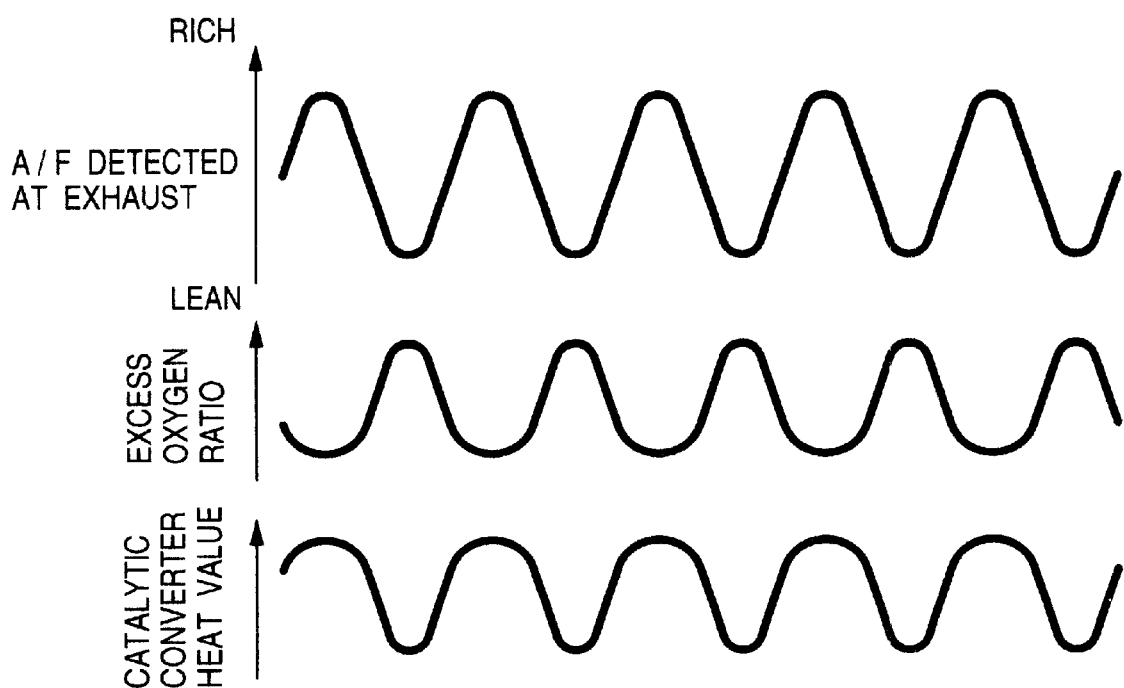
FIG. 5 is a chart for describing an operation of an embodiment of the present invention.
Figure 9:
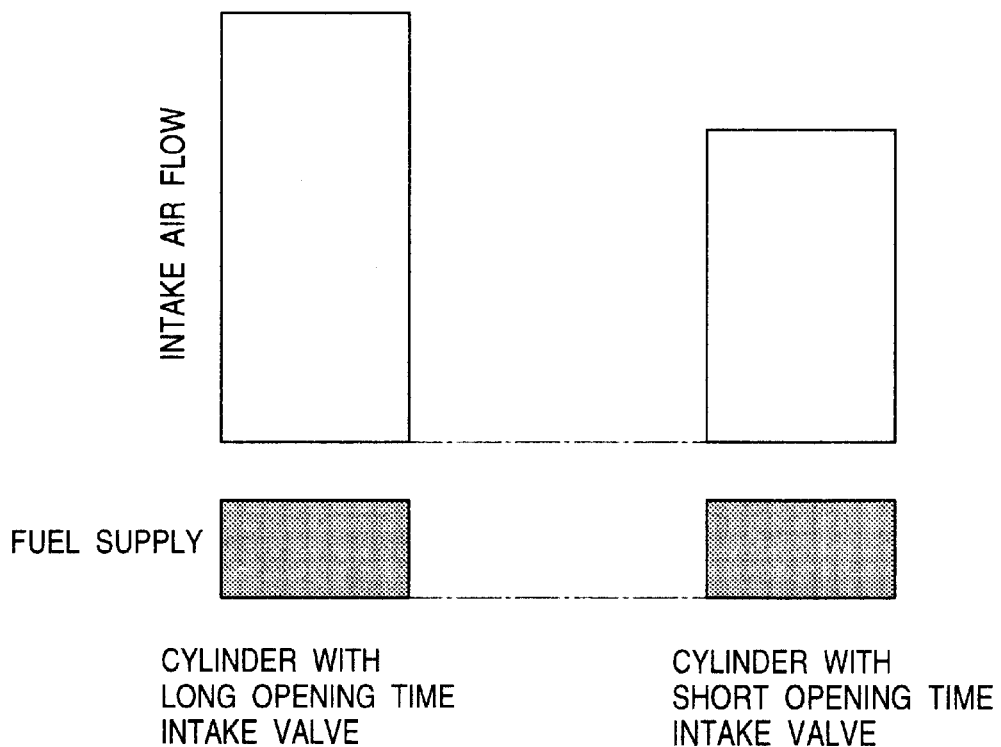
FIG. 9 is a view for describing an operation of an embodiment of the present invention.

Herein, as shown in FIG. 8, a cylinder is set to have an early timing when the intake valve is shut in the control state of the early shut of the intake valve and another cylinder is set to have a late timing. In FIG. 8, the #1 and #4 cylinders are set to have a late timing when the intake valve is shut and the #2 and #3 cylinders are set to have an early timing when the intake valve is shut. These valve timings are as shown in FIG. 1, for example. That is, a cylinder is provided for shutting the valve later than the timing when the intake valve is shut according to the target air flow and another cylinder is provided for shutting the valve earlier than the timing when the intake valve is shut according to the target air flow. In the late shut of the intake valve, the state shown in FIG. 2 takes place. The air flow and the fuel amount of each cylinder enters into the state shown in FIG. 9, where the cylinder of the intake valve keeping the long opening time indicates a large intake air flow, while the cylinder of the intake valve keeping the short opening time indicates a small intake air flow. However, no difference of the fuel amount takes place if the fuel is supplied without any discrimination of those cylinders. Hence, as shown in FIG. 8, in the cylinder of the intake valve with a long time opening discharges lean exhaust gas, while in the cylinder of the intake valve with a short time opening discharges the rich exhaust gas. In this state, the catalytic converter alternately receives the rich and the lean exhaust gases as shown in FIG. 5. The excess oxygen ratio of the exhaust gas indicates a large value when the lean exhaust gas is more lean than the stoichiometric ratio and when the lean exhaust gas is received as shown in FIG. 5. The catalyst serves to temporarily absorb and capture the gas components to be oxidized such as HC and CO, and oxidize HC and CO when there are oxygen in the atmosphere. When the exhaust gas derived from rich mixture gets into the catalyst, the catalyst captures HC and CO. When the exhaust gas derived from lean mixture gets into the catalyst, the catalyst oxides HC and CO with oxygen in the exhaust gas. At a certain time, the catalytic converter is heated for oxidation. Hence, if this operation is done at a low temperature before the catalytic converter is sufficiently activated, the exhaust emission control and the early activation of the catalytic converter may be realized.

Figure 6:
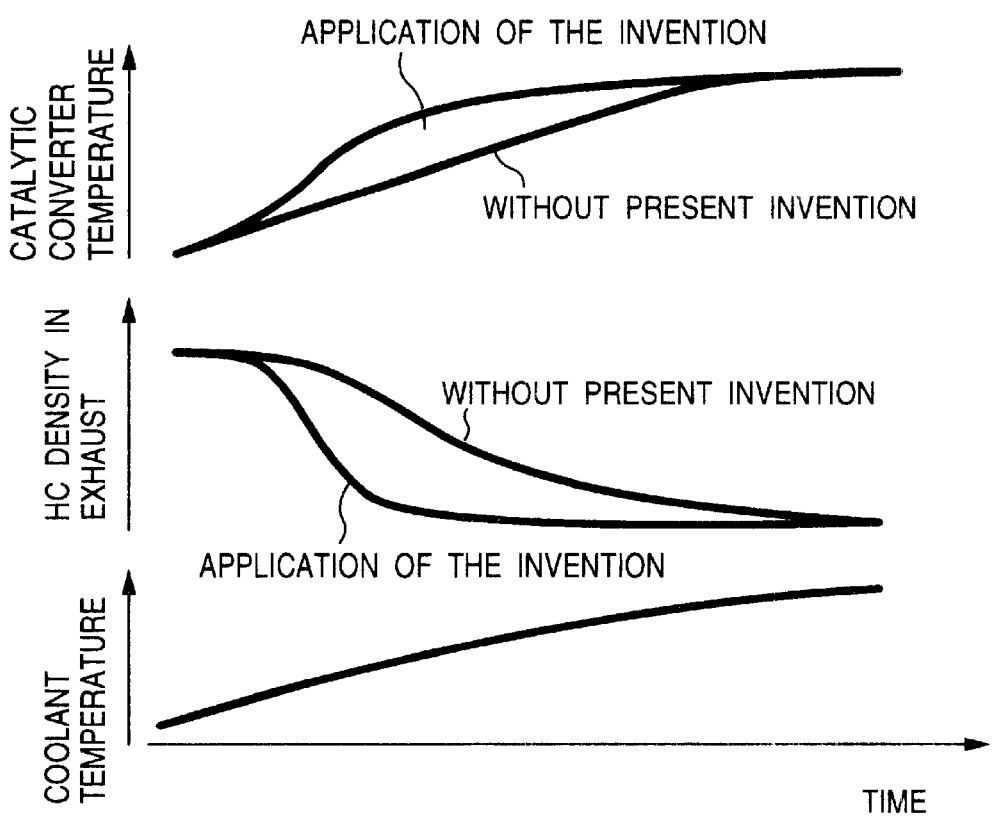
FIG. 6 is a chart for describing an operation of an embodiment of the present invention.

FIG. 6 shows the catalytic converter temperature, the HC exhaust density and the coolant temperature of the engine appearing when the foregoing operation is executed. With this intake valve timing control of the present invention, it is understood that the temperature of the catalytic converter is rapidly raised and the emission of HC is suppressed.

Herein, if the fuel supply is controlled to make the mixture rich or lean on the condition that every cylinder has the same intake air flow, it offers the same effect as the above in early activation of the catalytic converter. However, since those cylinders are supplied with different fuel amounts, the generated pressures in combustion are different in respective cylinders, so that the engine output fluctuate, which causes problems such as fluctuation of engine speed or surging of engine. On the other hand, with the method of the invention for controlling the intake air flow by controlling the intake valve timing, the explosion is substantially uniform in every cylinder, so that above mentioned problems are avoided.

Turning back to FIG. 1, if the target air flow is too large to set the cylinder of a large intake air flow, the present control cannot be executed. That is, if it is requested that the air flow for one intake is larger than a predetermined value, the present control cannot be executed. Hence, the conditions of determining if the present control is to be executed may preferably include the condition that the average target intake air flow for one combustion cycle is equal to or lower than the predetermined value.

The conditions of determining if the present control is to be executed may also contain the condition that the cylinder to be set to have lean mixture has to supply oxygen to the catalytic converter as keeping the cylinder at A/F value leaner than the stoichiometric A/F. However, since a stable combustion is difficult when the engine has still lower temperature and the vaporizing of the fuel supplied to the engine is not sufficient, in general, a stable combustion is realized by supplying the fuel to get a rich mixture richer than the stoichiometric ratio. Hence, if the present valve timing control is executed in such a state, the combustion is not done stably. This means that it is preferable not to execute the present control when the engine temperature is lower than a certain value. Further, executing the present control is meaningless. For the foregoing reasons, it is preferable to determine if the present control is started or stopped depending on a coolant temperature of the engine detected by a temperature sensor 23. Concretely, it is preferable to execute the present control between about 15° C. of the coolant temperature and about 60° C. before completion of the engine warm-up, between which the stable combustion of the engine may be secured at a lean A/F. Moreover, the object of the present control is to rapidly activate the catalytic converter. Hence, the present control should be executed not in the overall range of the coolant temperature but in the range where the object can be achieved.

By the way, in general, the control is executed to detect the components of the exhaust gas with the A/F sensor and then derive the target A/F based on the detected components. However, if the control in the closed loop is executed to make the cylinders rich or lean A/F values, the A/F sensor disables to detect the average A/F of all the cylinders. Hence, the control in the closed loop may detect an undesirable A/F or divergence. It means that when each cylinder is controlled at a rich or lean A/F value, it is preferable not to perform the valve timing control based on the output of the A/F sensor.

Figure 18:
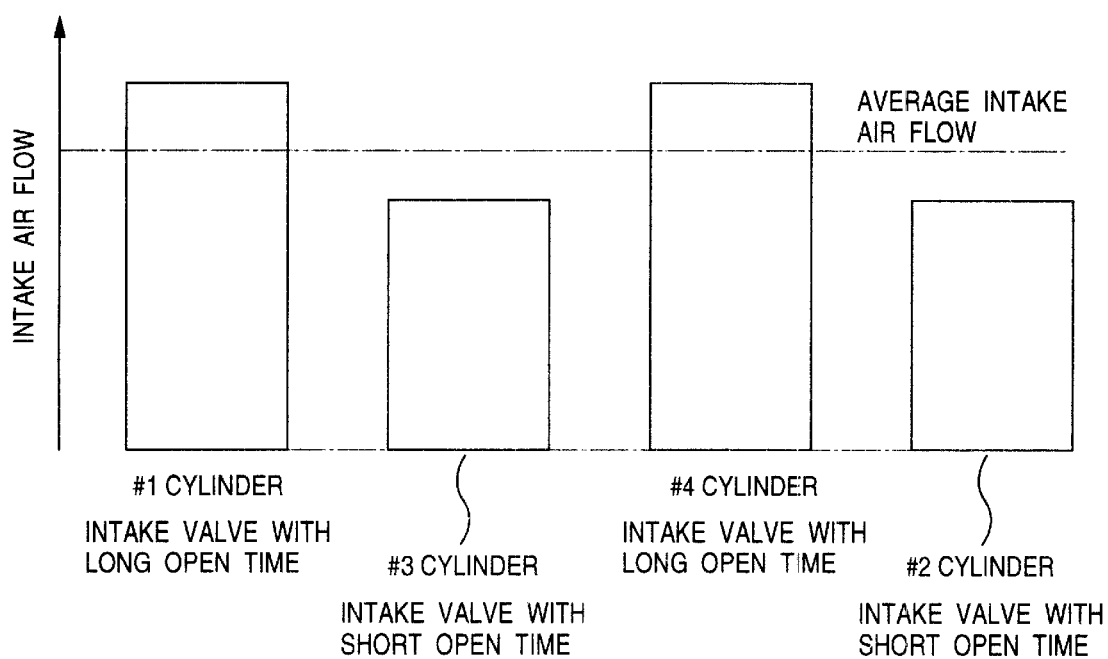
FIG. 18 is a chart for describing an operation of an embodiment of the present invention.

The output of the air flow meter indicates an average of the intake air flows of all the cylinders, and represents the air flow value indicated by an alternate long and short dash line of FIG. 18. Herein, the fuel supply is derived from the average air flow and the average target A/F of all the cylinders, and the A/F of each cylinder should be set so that the foregoing action of the catalytic converter may be displayed most effectively. Hence, it is preferable to employ the method of determining the average target A/F of all the cylinders, determine the target A/F of each individual cylinder according to the difference between the rich or lean value and the average target A/F, and set the target A/F to each individual cylinder. It means that the number of the cylinders set to the rich value should be equal to the number of the cylinders set to the lean value.

Figure 11:
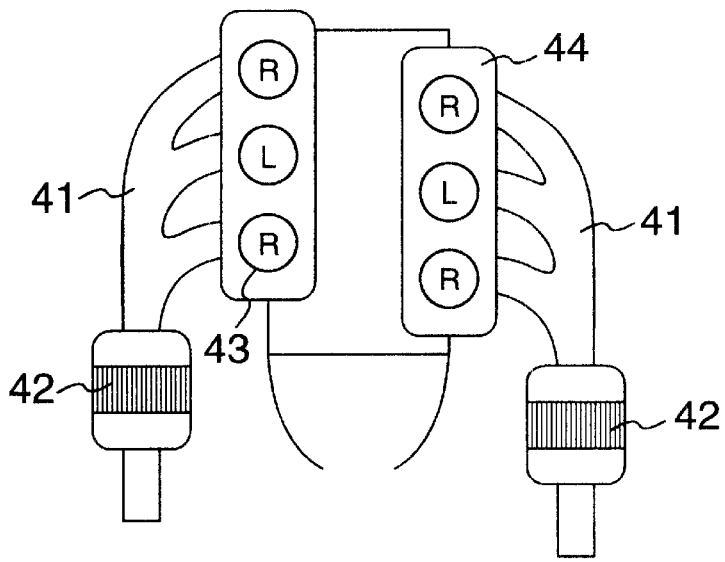
FIG. 11 is a view of an engine for describing an embodiment of the present invention.

In a case of V-type engine having two banks, the exhaust pipe and catalytic converter may be arranged for each individual bank as shown in FIG. 11. In FIG. 11, the left bank 43 and the right bank 44 are provided with an exhaust manifold 41 formed by respective exhaust pipes each of which is connected to the individual catalytic converter 42, respectively. In this engine, since the number of cylinders in one bank is odd number, the numbers of the rich A/F cylinders and lean A/F cylinders for one catalytic converter are not equal within one bank. In spite of that, according to the present invention, each cylinder is set to a rich F/F or lean A/F individually in each bank, while the numbers of the rich A/F cylinders and lean A/F cylinders are set to be equal each other within two banks.

Figure 12:
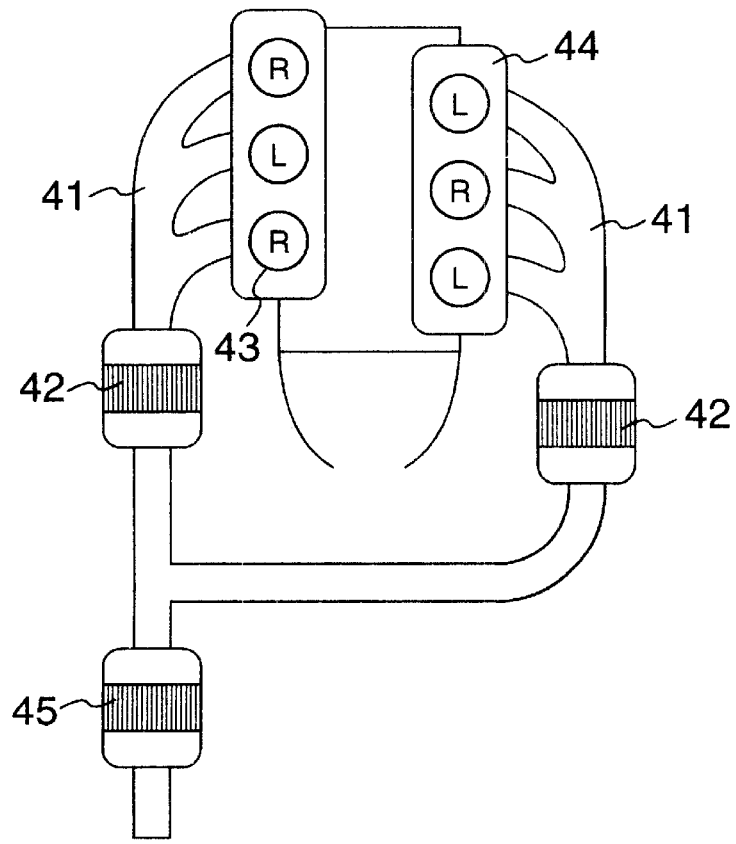
FIG. 12 is a view of an engine for describing an embodiment of the present invention.

Another example of an arrangement of the catalytic converters in a V-type engine is shown in FIG. 12. Unlike the construction shown in FIG. 11, this is constructed to merge exhaust pipes of the right bank and the left bank together after the catalytic converters of each banks, and then connect the exhaust pipes to another common catalytic converter 45. As means for supplying exhaust gas derived from the rich or lean mixture to the downstream catalytic converter 45, it is possible to set the average intake valve shutting timing of the right bank differently from the timing of the left bank and to supply the exhaust of lean A/F mixture from the right bank to the catalytic converter and the exhaust of rich A/F mixture when the exhaust from the left bank to the catalytic converter, thereby rapidly activating the catalytic converter.

The opening and closing timing of the intake valve is set at a given phase of a crank angle as described above. However, the response of the valve opening and closing is determined on the time. As is understood from FIG. 15, the movable member 33 is attracted by the magnetic force of the electromagnetic coils 31 and 32. It means that the response time of the movable member between the start and the stop of the member is determined on the attraction force and the mass of the member. This means that the valve timing to be requested is made quicker as the engine speed become higher, while the electromagnetic intake valve needs a given time to respond to the request. Thus, there may be a case that the requested valve timing is not realized in some response performance of the electromagnetic intake valve. Concretely, the minimum reciprocation time at the fastest valve operation has been fixed. If the switching of a shorter period than that minimum time is requested at the very high engine speed, the electromagnetic intake valve disables to follow such a quick operation. Hence, if the engine speed is faster than a predetermined certain value, it is not preferable to execute the present valve control.

Further, when the transition takes place from the state that all the cylinders have the same intake valve driving timing to the state that those cylinders have their individual valve driving timings, or reversely when the transition takes place from the state that all the cylinders have their individual timings to the state that those cylinders have the same timings, the air flow to be sucked into each cylinder may be changed stepwise from a predetermined combustion cycle, while the fuel amount may not be changed stepwise from a predetermined combustion cycle because the change of the state of the fuel adhering to inside wall of the intake port brings about the response lag in change. In the above-noted state transition, therefore, it is preferable to gradually change the intake valve operating timing so that the timing may follow the change of the fuel state.

The cylinder to be set to a rich value and the cylinder to be set to a lean value may be reversely set from a viewpoint of a function request for the control. On the other hand, there is a case that the particular cylinders to be always set to a rich A/F value or to a lean A/F value, combustion deficiency in the rich A/F cylinders takes place because of some failure and then carbon deposited on the ignition plug. The carbon on the ignition plug may be cleaned out by continuous combustion at high temperature. So the combustion at a lean A/F may be more effective. However, if the rich A/F setting involved by the present control is constantly done for specific cylinders, it is less expected to self-clean the carbon deposition. Hence, each time the engine starts or each time the engine enters into the present control, the cylinders set to be a rich A/F value are reversed to those set to a lean A/F value or vice versa, for enhancing the foregoing self-cleaning of the plug.

In turn, the description will be oriented to a concrete method of controlling the operation of the electromagnetic intake valve.

Figure 19:
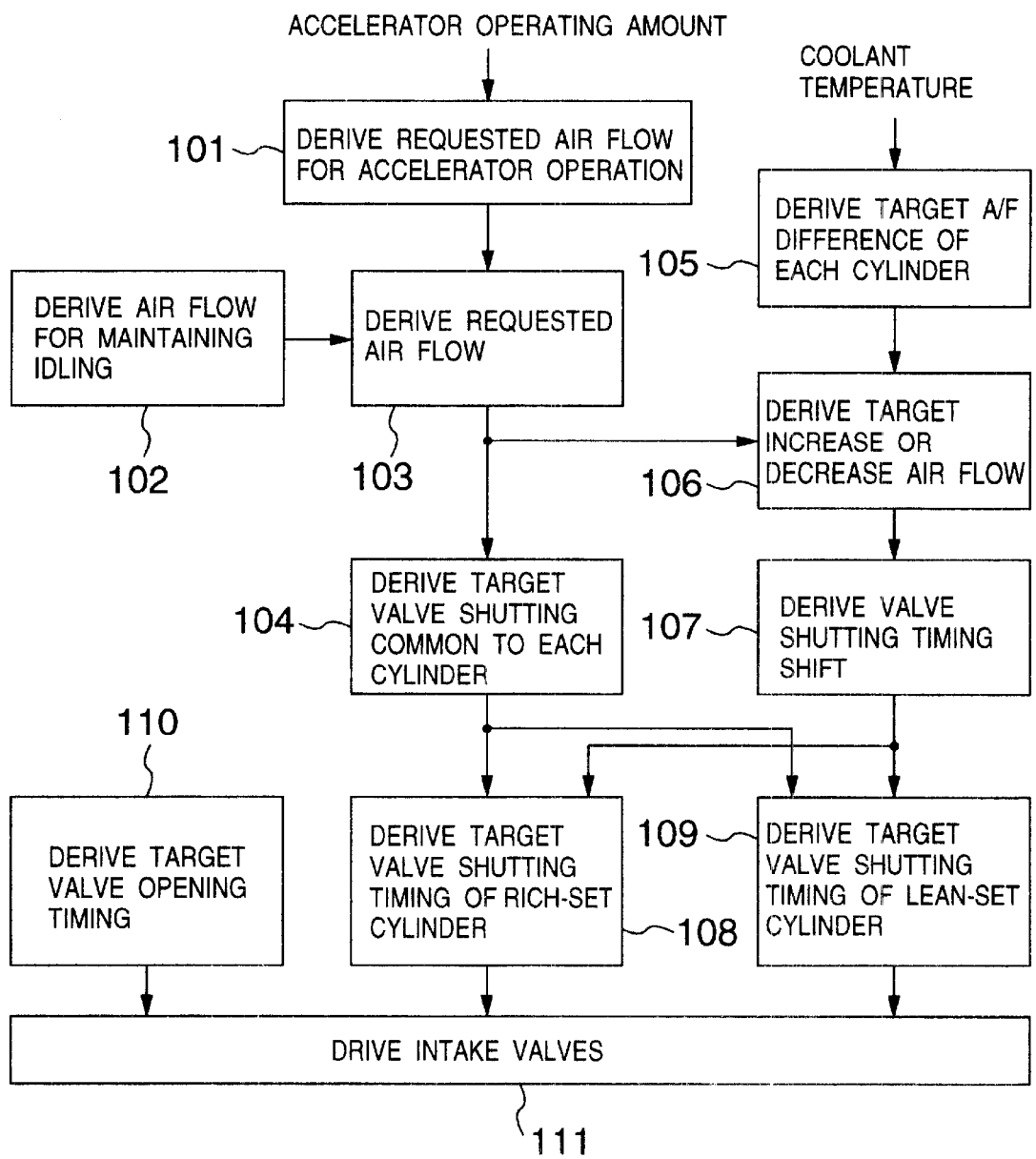
FIG. 19 is a block diagram for describing a construction of an embodiment of the preset invention.
Figure 23:
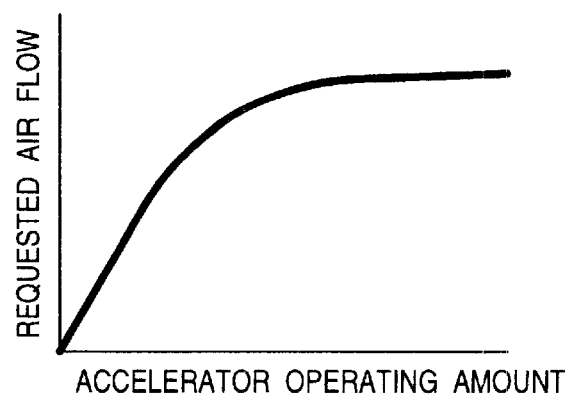
FIG. 23 is a chart for describing a characteristic of a typical commercially available engine.

FIG. 19 shows a flow of computation for deriving a command value for driving the intake valve according to an embodiment of the present invention. This shows a relatively simple content. At step 101, a requested air flow is calculated for obtaining the engine output corresponding to the accelerator operation amount that indicates how the driver wants the engine output. If the present system needs to offer the same output characteristic as the conventional system arranged to mechanically connect an accelerator pedal with the throttle valve, this method indicates the characteristic shown in FIG. 23. The relation between the accelerator operation amount depression of accelerator pedal) and the requested air flow is made nonlinear as shown in FIG. 23. Hence, the required air flow value may be determined by retrieval of a data table. On the other hand, the required air flow is derived from the requested engine output that is not relevant to the accelerator operation at a step 102. Herein, as a representative example, an air flow value for idling operation is described. The air flow value for idle operation is determined from the engine output required to keep the engine speed at a target idling speed by overcoming the friction torque of the engine, the drive of an air-conditioner, a generator for obtaining electric power, a driving power of an oil pump for a power steering, and so forth. Further considerations are a request from a constant speed running device and a request value from a traction control as a negative output request.

At a step 103, the operation is executed to calculate a total requested air flow by totaling the requested values obtained at the steps 101 and 102. At a step 104, the conversion of the characteristic as shown in FIG. 1 is executed to calculate the target valve opening timing common to all the cylinders.

On the other hand, at a step 105, the operation is executed to derive the target A/F difference in each cylinder that offers the effect of activating the catalytic converter at an early stage. The requested value indicates a complicated characteristic based on the chemical performance of the catalytic converter. Thus, it is preferable to retrieve the set value from the data table based on the coolant temperature.

At a step 106, the operation is executed to calculate a shift amount of the valve opening timing from the target A/F difference and the requested air flow obtained at the step 105. On the condition that the fuel supply is constant, the change of the A/F is derived from a ratio of the change of the air flow to be supplied to the original air flow. Hence, by multiplying the ratio of the A/F difference to the reference A/F by the requested air flow, it is possible to derive the supplied air flow difference. Then, by multiplying the supplied air flow difference by an air flow change gain caused by the change of the intake valve shutting timing, it is possible to derive the timing shift amount. Considering that the air flow change gain caused by the change of the intake valve shutting timing is constant, the above-mentioned is realized by a relatively simple formula of (A/F difference)/(reference A/F)×(requested air flow)×(a gain).

At a step 108, the valve shutting timing of the cylinder set to be at a rich A/F value, (target valve shutting timing)−(timing shift amount) is derived from the intake valve shutting timing parameter obtained at the steps 104 and 107. Likewise, at a step 109, the valve shutting timing of the cylinder set to be at a lean A/F value, (target valve shutting timing)+(timing shift amount) is derived from the same.

Figure 22:
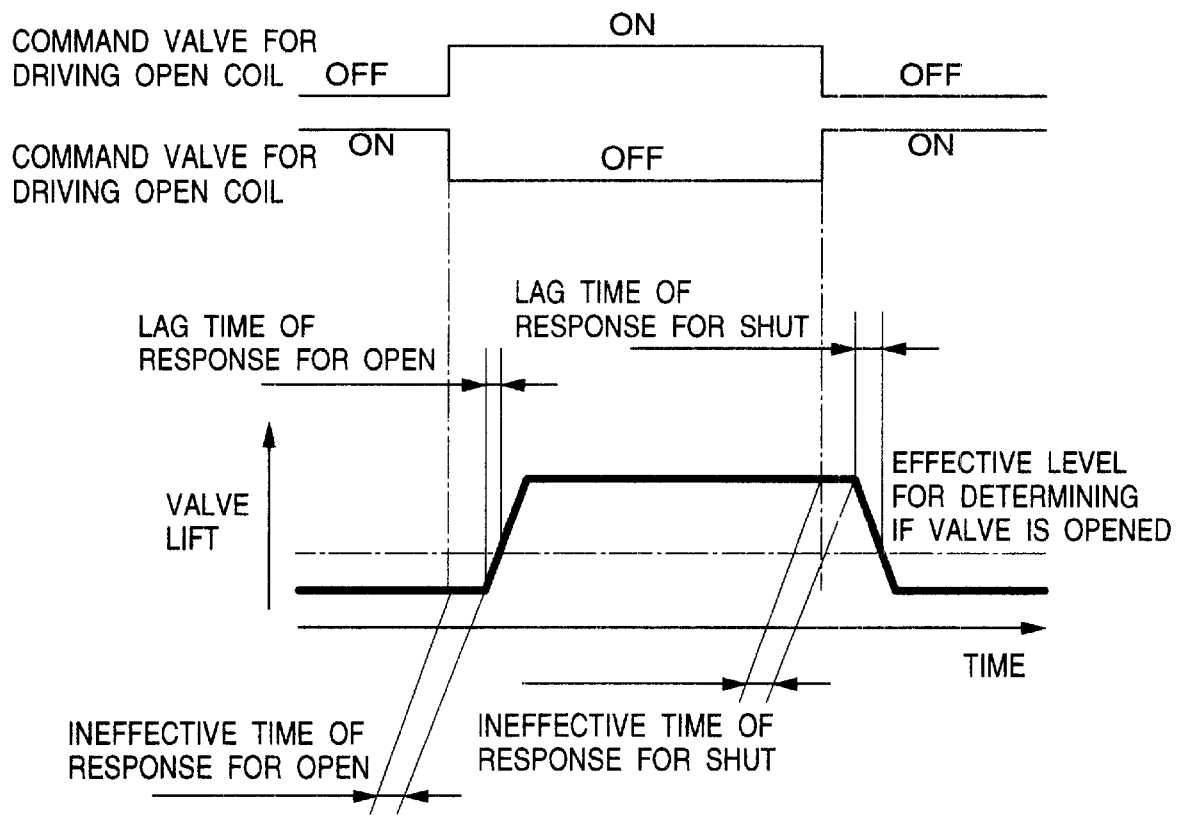
FIG. 22 is a timing chart for describing an operation of an electromagnetic intake valve.

At a step 111, the intake valve is controlled on the basis of the valve opening timing derived at the step 110 and the valve shutting timing of each cylinder derived at the steps 108 and 109. The concrete control of the intake valve driving is described below. The response of the valve as shown in FIG. 22 contains an ineffective and lag times about the command value for opening and shutting the coil, which may be changed according to the environment of the valve. Those ineffective and lag times are estimated. By referring to those estimated values, the output timing of the command for opening and shutting the coil is determined so as to allow the effective opening and shutting timing to comply with the requested value.

The target valve opening timing as shown at the step 110 is located at the TDC if a simple physical phenomenon as described with reference to FIG. 1 takes place. In actual, however, the inertia charge effect of intake air exists as a factor of determining the intake efficiency of the engine. This effect has an influence on the intake valve opening timing. Further, when an inner EGR (Exhaust Gas Recirculation) should be implemented, the intake valve opening timing has an influence on the inner EGR. Hence, it is necessary to control the intake valve opening timing according to the target driving state of the engine. At the step 110, the target intake valve opening timing is determined in response to these requests.

Figure 10:
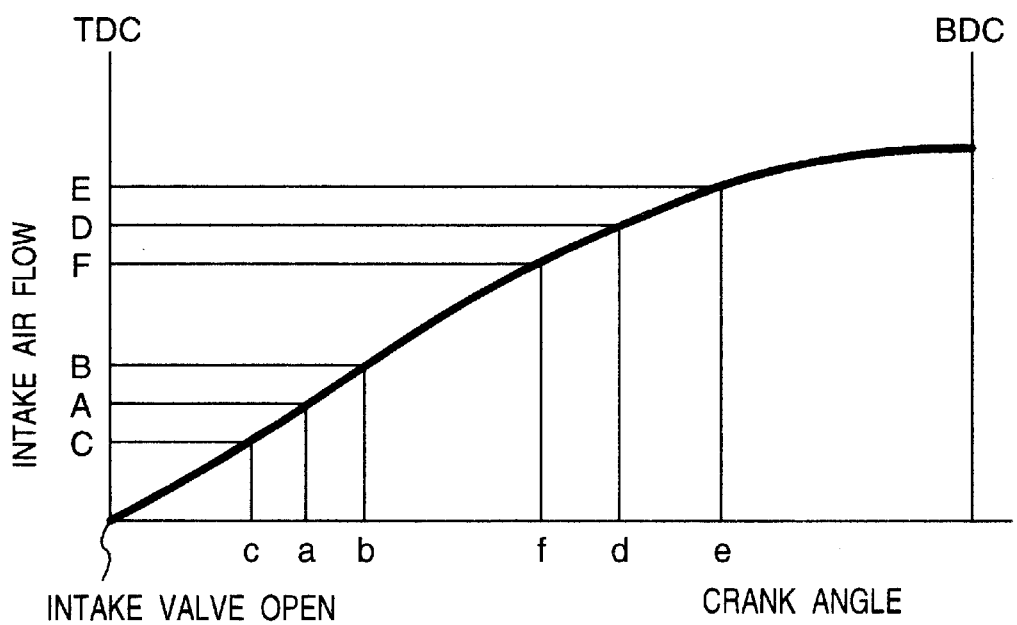
FIG. 10 is a chart for describing an operation of an embodiment of the present invention.

In the embodiment described with reference to FIG. 19, it is considered that the air flow change gain caused by the change of the intake valve shutting timing is constant. This is established if the requested intake air flows are A, B and C as shown in FIG. 10. However, the application of the present invention to the requested intake air flows D, E and F brings about an unfavorable state. Assuming that the average requested air flow of the cylinders is A, the requested air flow of the cylinder set to a rich value is C, and the requested air flow of the cylinder set to a lean value is B, the requested valve shutting timings of those air flows are a, c, and b from the relation as shown by a thin line of FIG. 10. The relation between the air flow and the valve opening timing indicated by a thick line has a substantially constant inclination among A, B and C. Hence, when (B−A) is equal to (A−C), (b−a) is also equal to (a−c). That is, it is considered that the air flow change gain caused by the change of the intake valve shutting timing is constant.

However, the similar relation cannot be established among the requested air flows D, E and F as is understood from FIG. 10. This is because the air flow change gain caused by the change of the intake valve shutting timing is changed inside of the area.

Figure 17:
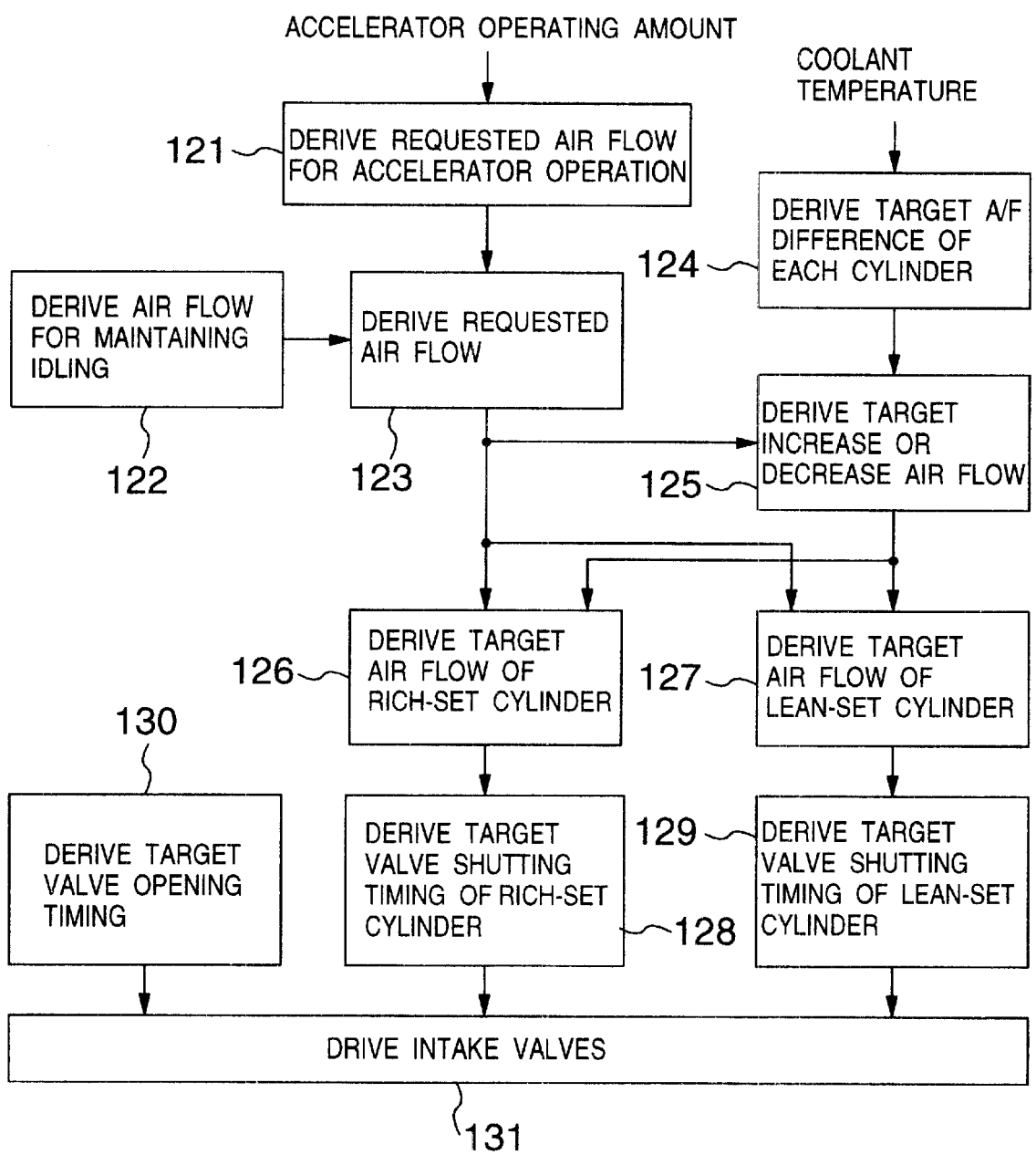
FIG. 17 is a block diagram for describing a construction of an embodiment of the present invention.

FIG. 17 shows an embodiment in which the present invention is applied to the areas D, E and F shown in FIG. 10.

The processes at steps 121, 122, 123, 145 and 125 have the similar functions to those at the steps 101, 102, 103, 105 and 106. In this embodiment, the processes at the steps later than the step 125, that is, the steps 126 and 127 are different from those of the precious embodiment. At the steps 126 and 127, in order to obtain the target air flow of each cylinder, for the cylinder set to a lean value, the target increase or decrease of the air flow derived on the requested air flow is added, while for the cylinder set to a rich value, it is subtracted. In step 128, a target intake valve shutting timing for rich-set cylinder is determined, and in step 129 the target intake valve timing for a lean-set cylinder is determined. The concrete method is to set the characteristics shown in FIG. 1 to a data table and retrieve the proper one on the target air flow from the data table. In response, the intake valve is driven at steps 130 and 131. The processes at the steps 130 and 131 have the similar functions to those at the steps 110 and 111 shown in FIG. 19. The advantage of this embodiment is, as mentioned above, to control the setting of a rich or a lean A/F value to each cylinder on a wide range of valve driving timing, while this embodiment has one more operation for retrieving the table as compared with the embodiment shown in FIG. 19. In general, the process for the table retrieval contains comparison of numeric values in magnitude, multiplication, and division. Hence, if the microcomputer is in charge of those operations, the microcomputer is burdened with computational load.

Figure 13:
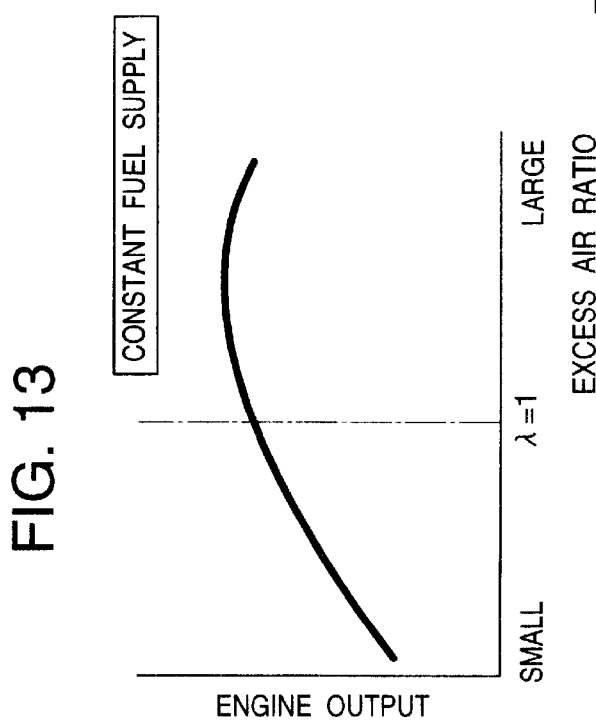
FIG. 13 is a chart for describing an example of a characteristic of an engine.
Figure 20:
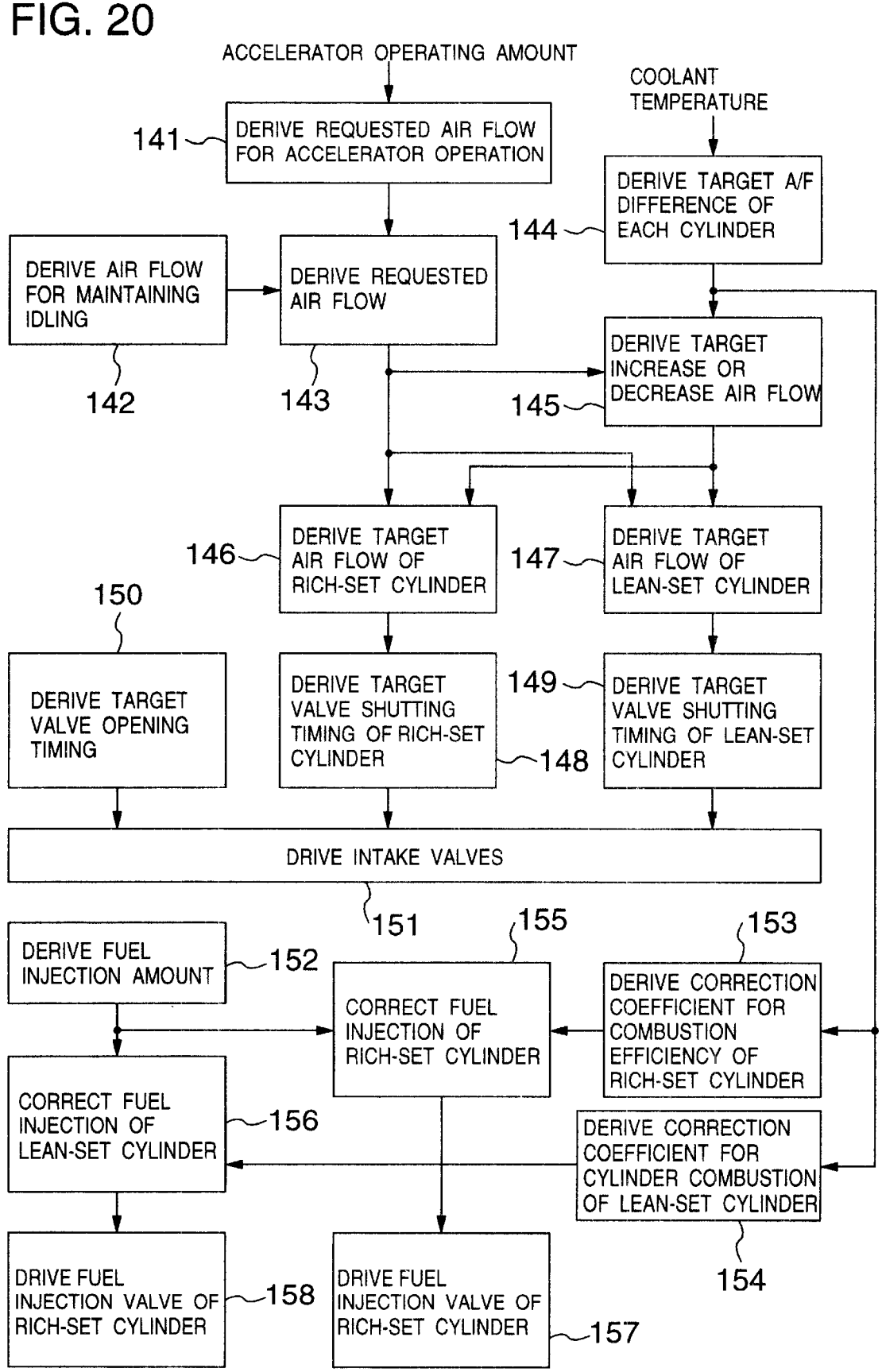
FIG. 20 is a block diagram for describing a construction of an embodiment of the present invention.

FIG. 20 shows an embodiment in which the engine state is controlled more precisely. The processes at steps 141 to 151 have the similar functions to those at the steps 121 to 131 shown in FIG. 17. That is, the driving control of the intake valve is similar to the operation described with reference to FIG. 17. Herein, in the embodiment described with reference to FIG. 17, the operation of a fuel injection amount is not directly related with the descriptive rate shown in FIG. 17, while in the embodiment described with reference to FIG. 20, at steps 153 and 154, the operation is executed to derive a correction coefficient of a cylinder set to a rich and a lean values from the target air/flow ratio of each cylinder derived at the step 144. The correction coefficient for the combustion efficiency will be described with reference to FIG. 13. FIG. 13 shows a graph for representing change of an engine output appearing when the excess oxygen ratio is changed on the assumption that the supply air flow is made variable by operating the intake valve operating timing when the supply fuel amount is constant. In this graph, $\lambda=1$ indicates the stoichiometric state at which the supply fuel are properly combusted with the supplied air. In the state that the excess air ratio is smaller than $\lambda=1$, that is, it is rich, part of the supply fuel cannot be combusted because of shortage of the air flow and converted into the engine output, thereby lowering the engine output as the excess air ratio is made smaller. On the other hand, in the state that the excess oxygen ratio is greater than λ=1, that is, it is lean A/F, the air supply is quantitatively large enough to combust all the supply fuel. However, the fuel not to be combusted during a limited combusting time is more likely to be combusted as the excess air ratio is made larger, thereby improving the combustion efficiency and reducing the loss in the intake stroke as the intake air is made larger, thereby improving the combustion efficiency as well. As a result, with increase of the excess air ratio, the engine output is gradually increased. Further, if the mixture is more lean than a certain excess air ratio, the engine output is made lower because of the worse combustion.

As will be understood from the above, if every cylinder has individual intake air flow but the same fuel supply each other, the cylinder set to a rich A/F value generates lower engine output, while the cylinder set to a lean A/F value generates higher engine output. Hence, by reversely correcting the corresponding fuel amount to the output change of both types of cylinders, it is possible to equalize the output of the cylinder set to a rich A/F value with the output of the cylinder set to a lean A/F value. At a step 153, the operation is executed to obtain the increase rate of the fuel corresponding to the lowered output of the cylinder set to a right value as a correction coefficient of the combustion efficiency. At a step 154, the operation is executed to obtain the decrease rate of the fuel corresponding to the increased output of the cylinder set to a lean value as a correction coefficient of the combustion efficiency. Concretely, it is preferable to set the reverse characteristics to the characteristics shown in FIG. 13 to a data table and then execute the table retrieval for obtaining the correction coefficients. At steps 155 and 156, these correction coefficient of the combustion efficiency are multiplied by the fuel injection amount derived at the step 152 for deriving the target fuel injection amount of each cylinder. Then, at steps 157 and 158, the fuel injection valve of each cylinder is driven on those fuel injection amount of each cylinder.

Figure 16:
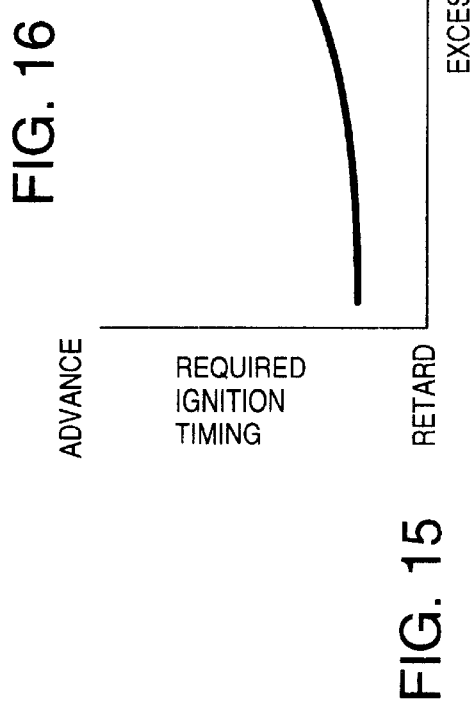
FIG. 16 is a chart for describing an example of a characteristic of an engine.
Figure 21:
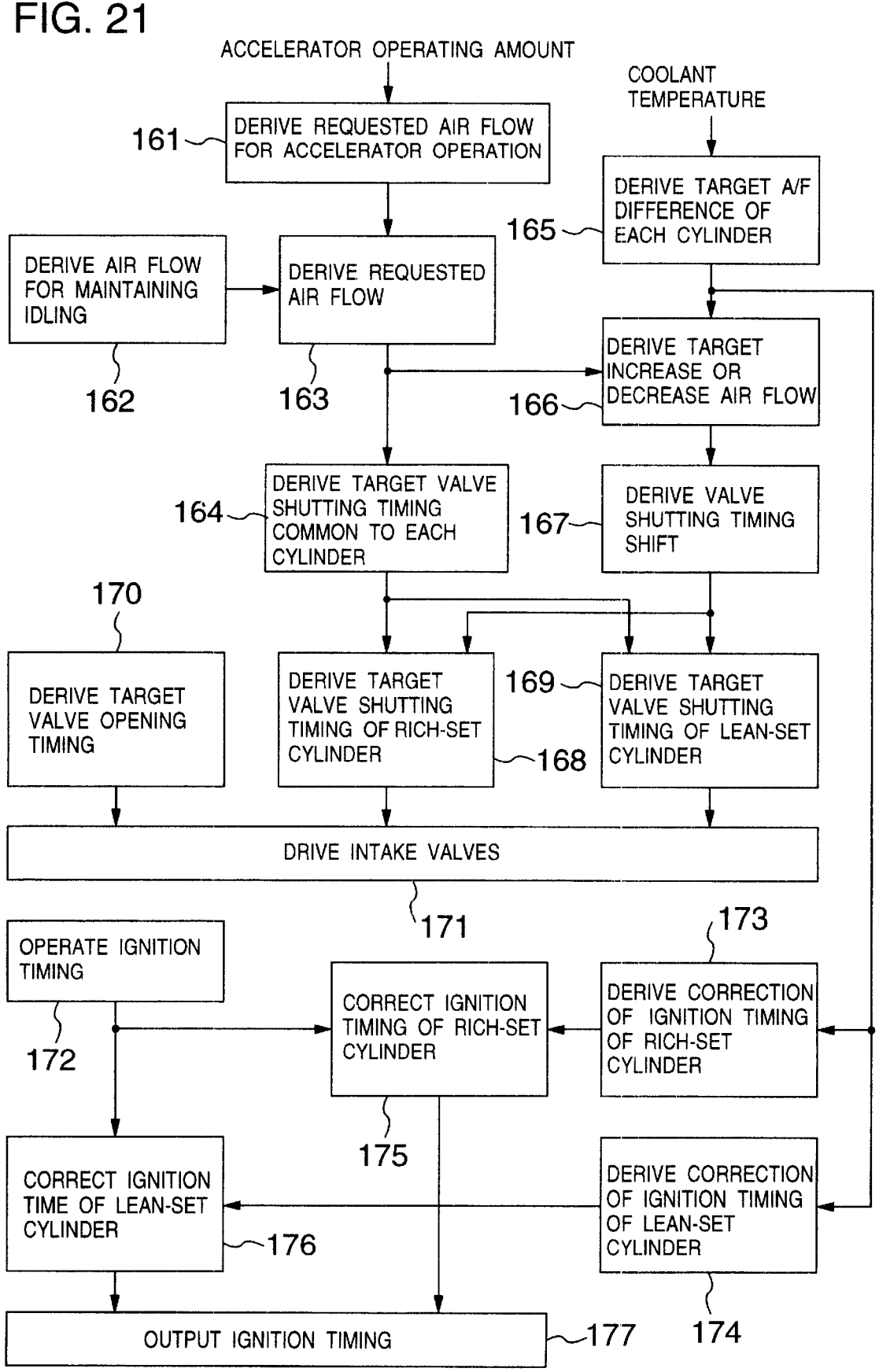
FIG. 21 is a block diagram for describing a construction of an embodiment of the present invention.

Further, by individually setting the A/F to each cylinder, from a strict point of view, the required ignition timing of each cylinder is different from that of the other cylinder. FIG. 16 shows a relation between the excess air ratio that substantially means the A/F and the required ignition timing. In general, since the combustion speed is faster when the excess air ratio is small, the required ignition timing is retarded, while since the combustion speed is slow when the excess air ratio is small, the requested ignition timing is advanced. That is, preferably, in the cylinder set to a rich A/F value, the ignition timing is retarded to meet the characteristic shown in FIG. 16, while in the cylinder set to a lean A/F value, the ignition timing is advanced by the same process so as to realize a proper combustion. An embodiment of the present invention for realizing such a control is shown in FIG. 21. The process ranging from steps 161 to 171 has the similar function as the process ranging from the steps 101 to 111 shown in FIG. 19. It means the control for driving the intake valve is the same as the control described with reference to FIG. 19. In the embodiment described with reference to FIG. 19, the operation of the ignition timing is not directly related with the descriptive scope with reference to FIG. 19, while in the embodiment to be described with reference to FIG. 20, at steps 173 and 174, the correction for the ignition timings of the cylinders set to a rich value and a lean value are derived from the target A/F of each cylinder derived at the step 165. Concretely, it is preferable to set the characteristics shown in FIG. 16 to a table and retrieve the table for the corrections. At steps 175 and 176, these corrections for the ignition timings are added to the ignition timing common to all the cylinders derived at the step 172 for obtaining the target ignition timing of each cylinder. At a step 177, an ignition signal is outputted at the ignition timing of each cylinder obtained above.

The foregoing description has been concerned with some embodiments of the control device for an engine provided with an electromagnetic driven intake valve according to the present invention. It goes without saying that the present invention is not limited to the foregoing embodiments and may be modified in various forms without departing from the spirit of the invention described in the appended claims.

The control device for an engine provided with an electromagnetic driven intake valve according to the present invention is capable of independently operating the intake valve in each cylinder with an electric command value. Hence, the present invention makes it possible to realize compatibility and securement of a desired control and drivability at any necessary time, the desirous control including activation of the catalytic converter at an early stage without unfavorable phenomena such as fluctuation of engine speed or surge of the engine.

What is claimed is:

1. A control device for an engine provided with electromagnetic driven intake valves, comprising:

each of said electromagnetic driven intake valves being driven and controlled individually; and means for controlling at least one of a given number of cylinders, wherein valve opening or shutting timing of the electromagnetic driven intake valve of a predetermined cylinder is controlled to be different from that of the other cylinders while fuel supply to said engine is executed based on the same operation in said given cylinder and the other cylinders, so that said given cylinder and said the other cylinders are supplied with mixtures in different air/fuel ratios including rich and lean mixtures thereby to cause temperature rising of a catalytic converter and to prompt repeat activation of a catalytic converter for purifying exhaust gas, wherein when the control in which said given cylinders are different in the opening or shutting timing of the intake valves in crank angle from said other cylinders is executed, the control for adjusting the fuel supply based on an actual exhaust A/F is prohibited.

2. A control device as claimed in claim 1, wherein the number of said given cylinders is equal to the number of the other cylinders.

3. A control device as claimed in claim 1, wherein any ones of said given cylinders and the other cylinders are controlled to lag the opening and shutting timing of said intake valves behind a target reference timing value and the others are controlled to forward the opening and shutting timing of said intake valve rather than the target reference value and the lagging period and the forwarding period from said target reference value have the same absolute value.

4. A control device as claimed in claim 1, wherein said controlling means executes the steps of:

deriving a target intake air flow common to each cylinders;

deriving a target increase or decrease air flow to be increased or decreased in each cylinder;

totaling said target increase or decrease air flow and said target air flow for deriving a target air flow of each cylinder of said given cylinders;

deriving an intake valve operating timing of said given cylinders from said target air flow of each cylinder and deriving the target air flow of each cylinder about the other cylinders rather than said given cylinders by decreasing said target increase or decrease air flow from said target air flow;

deriving the intake valve operating timing of the other cylinders from the target air flow of each cylinder about the other cylinders; and determining the cylinders to be driven on said intake valve operating timing about said given cylinders and said other cylinders, based on a driving state, and driving said intake valve.

5. A control device as claimed in claim 1, wherein said controlling means executes the step of:

when correcting a fuel to be supplied to said engine, about said given cylinders, correcting a fuel supply to said given cylinders so that combustion efficiency may be corrected on a target A/F of said given cylinders and supplying said corrected fuel; and about the other cylinders, correcting a fuel supply to the other cylinders so that combustion efficiency may be corrected on a target A/F of the other cylinders and supplying said corrected fuel.

6. A control device as claimed in claim 1, wherein said given cylinders have the different opening or shutting crank angle timing of said intake valves from said other cylinders and said given cylinders are different in an ignition timing from said other cylinders.

7. A control device as claimed in claim 1, wherein when the control state of said other cylinders whose opening or shutting crank angle timing of said intake valves are different from said given cylinders is shifted into the control state in which operation timings of said intake valves of all the cylinders have the same values, said operation timings are being gradually shifted.

8. A control device as claimed in claim 1, wherein the control in which said given cylinders are different in the opening or shutting timing in crank angle from said other cylinders is executed each time said engine is started.

9. A control device as claimed in claim 1, wherein the control in which said given cylinders are different in the opening or shutting timing of the intake valves in crank angle from said other cylinder is executed when the average target intake air flow of one combustion cycle is equal to or lower than a predetermined value.

10. A control device as claimed in claim 1, wherein the control in which said given cylinders are different in the opening or shutting timing of the intake valve in crank angle from said other cylinders is prohibited when an engine speed is greater than a predetermined value.

11. A control device as claimed in claim 1, wherein when a coolant temperature of said engine is lower than an engine warming temperature, said given cylinders are controlled to be different from said other cylinders in said opening or shutting crank angle timing of said intake valve.

12. A control device as claimed in claim 11, wherein the coolant temperature of said engine is 60° C. or lower.

13. A control device as claimed in claim 1, wherein about the engine having plural banks, in each bank, said given cylinders are controlled to be different from said other cylinders in said opening or shutting crank angle timing.

14. A control device as claimed in claim 13, wherein an average opening or shutting crank angle timing of the intake valves in one bank is different from an average opening or shutting crank angle timing of the intake valves in another bank.

15. A control device for an engine provided with individually driven and controlled electromagnetic driven intake valves, comprising:

a controller configured to control at least one of a given number of cylinders, wherein valve opening or shutting timing of the electromagnetic driven intake valve of a predetermined cylinder is controlled to be different from that of the other cylinders while fuel supply to said engine is executed based on the same operation in said given cylinder and the other cylinders, and to supply said given cylinder and said the other cylinders with mixtures in different air/fuel ratios including rich and lean mixtures thereby to cause temperature rising of a catalytic converter and to prompt repeat activation of a catalytic converter for purifying exhaust gas, wherein, when the control in which said given cylinders are different in the opening or shutting timing of the intake valves in crank angle from said other cylinders is executed, the control for adjusting the fuel supply based on an actual exhaust A/F is prohibited.

* * * * *